United States Patent
Andersson et al.

[11] 3,741,328
[45] June 26, 1973

[54] WEIGHING DEVICE WITH CANTILEVER WEIGHING CELLS

[75] Inventors: John-Erik Andersson; Jan Kenneth Gustafsson; Rolf Paul Haggstrom; Bengt-Ake Karlsson, all of Karlskoga, Sweden

[73] Assignee: Aktiebolaget Bofors, Bofors, Sweden

[22] Filed: Apr. 7, 1971

[21] Appl. No.: 131,867

[30] Foreign Application Priority Data
Apr. 13, 1970 Sweden.............................. 4986/70

[52] U.S. Cl............ 177/210, 177/DIG. 9, 73/141 A
[51] Int. Cl............................................... G01g 3/14
[58] Field of Search.................... 177/134, 211, 229, 177/DIG. 9, 187, 210; 73/141 A

[56] References Cited
UNITED STATES PATENTS
| | | | |
|---|---|---|---|
| 3,340,726 | 9/1967 | Armstrong et al................ | 73/133 X |
| 3,103,984 | 9/1963 | Ellis et al............................ | 177/211 |
| 3,610,352 | 10/1971 | Laimins.............................. | 177/134 |

FOREIGN PATENTS OR APPLICATIONS
| | | | |
|---|---|---|---|
| 787,320 | 12/1957 | Great Britain................. | 177/DIG. 9 |

Primary Examiner—George H. Miller, Jr.
Attorney—Frederick E. Hane et al.

[57] ABSTRACT

A scale for weighing heavy loads comprising a horizontally disposed frame structure in which a load platform is horizontally supported by load cells at least at three points. The peripheral outline of the platform is such that it can be laterally and vertically displaced within the frame structure. The load cells include strain gauges each of which comprises a first and a second elongate member. The first member is fixedly secured to one end of the second member in a parallel aligned relationship therewith. One member of each strain gauge is secured to the frame structure and the other supports the platform. The members in the strain gauges are free to bend in response to a load placed upon the platform and such bending sets up corresponding potentials which are indicative of the load and are measured by suitable measuring means. Moreover, between some of the strain gauges and the platform are abutting bearing means so constructed that lateral movements of the platform cause vertical movements of the platform.

7 Claims, 17 Drawing Figures

3,741,328

PATENTED JUN 26 1973

Fig. 7a
Fig. 7b
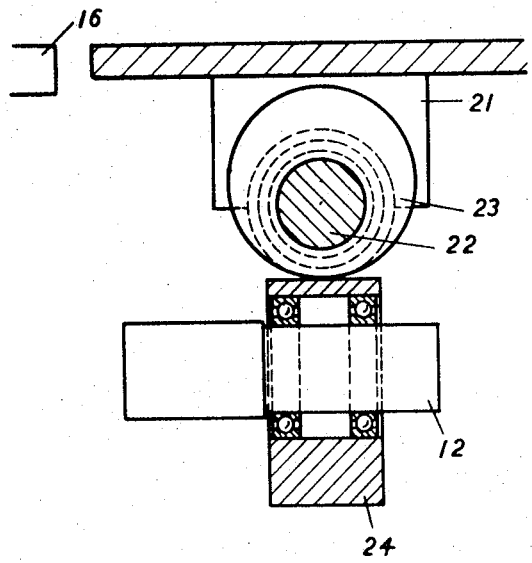
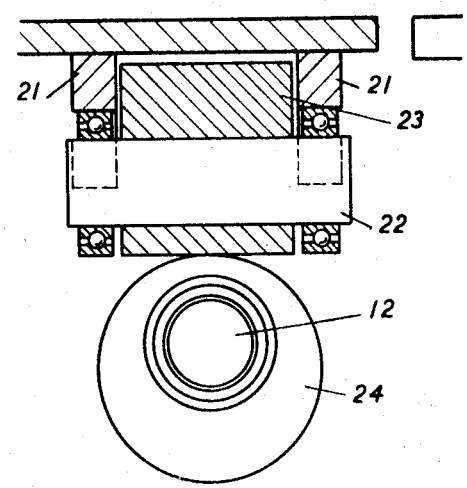
Fig. 8a
Fig. 8b
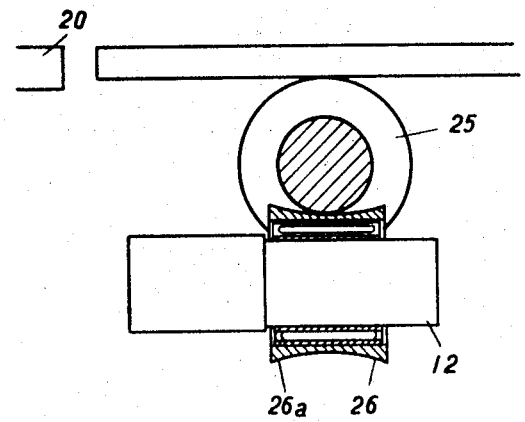
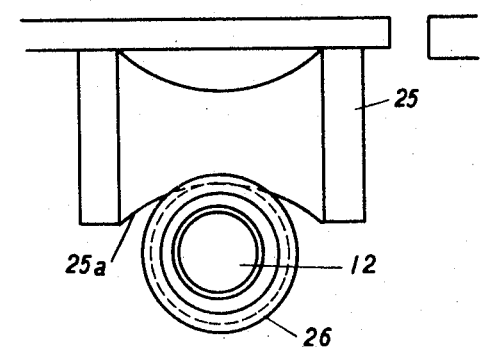

WEIGHING DEVICE WITH CANTILEVER WEIGHING CELLS

This invention relates to a weighing device, especially in the shape of a platform scale, which is provided with a movable part applied at a predetermined number of points on a foundation in each point comprises a load cell with strain gauges used for the weighing operation. Each load cell comprises an essentially beam shaped first body whose first end can be fully bent while being rigidly attached to the first end of a beam shaped second body, which runs in parallel with an unobstructedly beside the first body. Each load cell is attached to the foundation by its first body and supports the movable part by its second body, or vice versa, so that a force caused by a load placed on the movable part is exerted against the load cell at a right angle to its neutral axis, whereby the movable part also applies a force on the load cell via an adjacent bearing means so that any sidewise movement of the movable part, caused by a dynamic lateral force causes an increase of the energy level in the movable part.

In weighing devices it is has been proposed to use a load cell similar to the one shown in FIG. 11 below which consists of a sensitive enclosed element provided with strain gauges so that the element is exposed for axial traction and compressive forces when the load is applied, whereby the strain gauges give an electrical signal which more or less is supposed to be proportional to the load applied. Because such load cells depend on special flexural supports. Such a construction is increasingly costly for devices with accuracy. Therefore, there is a pronounced need for weighing devices which, despite high measuring accuracy, have a simple construction.

The present invention uses the knowledge of the fact that a special load cell can be used at the weighing devices in question, namely the load cell accordingly to the Swedish Patent No. 311.573. While this load cell permits direct applying of the forces and, moreover, is independent of where the forces are applied along the neutral axis of the load cell, all flexural support can be eliminated from the weighing device.

Now, the present invention in addition to the fact it has an extremely high measuring accuracy, which is independent of where on the movable part (platform) the load is applied can also provide for rapid weighing because its movable part is applied on the load cells via a bearing means which permits a gentle retardation and backward motion of the movable part when, for example, trucks, vehicles etc. slow down and get off on the movable part. Furthermore, the present weighing device is very robust, simple to manufacture and to calibrate. Another great advantage is that the device is extremely low, which makes driving ramps for vehicles, foundation etc. much more simple to construct. A low weighing device also brings with it a simplified handling of the load, especially heavy loads.

The most significant characteristics of the present invention are that there are at least three load cells and suspension points and that the bearing means also are arranged to obtain for the movable part a gentle retardation of lateral movement by the movable part and a gentle backward motion to the position of repose The invention is described below particularly with reference to the accompanying drawings, in which illustrative embodiments of the devices according to the invention are represented.

FIG. 5 – 8b are vertical cross-sectional views of different embodiments of a bearing means in accordance with the invention.

Figure 1:
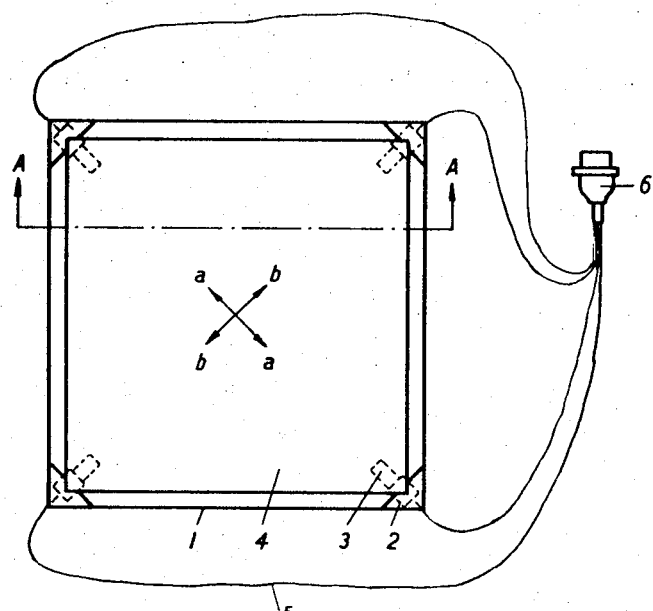
FIG. 1 is a horizontal view of a weighing device in the shape of a self-restoring platform scale with four suspension points.

In FIG. 1 a foundation or a frame 1 associated with a platform scale is formed in the horizontal plane with an essentially rectangular cross-section. To each of the corners of the foundation an attachment 2 is applied. The attachment is used for attaching a load cell 3 and also both as a reinforcement of the foundation. Each load cell 3 comprises a beam shaped first body whose first end can be freely bent but is rigidly attached to the first end of a beam shaped second body, which runs in parallel with and unobstructedly beside the first body. Each load cell is attached to its respective part 2 by the second end of the first body so that its neutral axis essentially coincides with is associated bisector of the corner of the foundation. The movable part 4 of the weighing device rests more particularly on four load cells, on the beam shaped second bodies of these cells. The movable part in this example is constructed as a platform. The outside demensions of the horizontal cross-section of the movable part 4 are smaller than the inside dimensions of the foundation or frame 1 in the same cross-section so that a preresolved free motion margin is obtained between the platform and the foundation. An electrical conductor 5 runs from each load cell, whereby all the conductors are taken together in contact means 6 which can be connected to a (not shown) instrument device.

Figure 2:
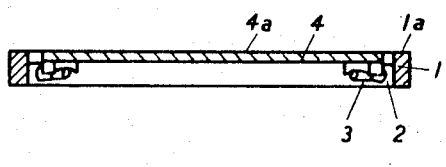
FIG. 2 is a vertical cross-sectional view of the device in FIG. 1, taken along the line A—A.

FIG. 2 illustrates the great advantages obtained from the shown plat-form scale, namely that the scale in question can be made extremely low. Moreover, FIG. 2 shows that an upper surface 4a of the platform 4 can be placed essentially at the same height as the upper surface 1a of the foundation or frame 1.

Figure 3:
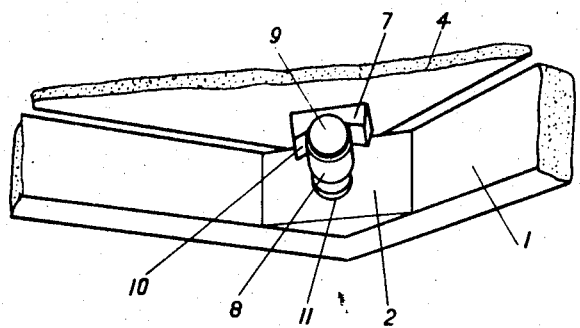
FIG. 3 is a perspective view from details in FIG. 1 and 2.

FIG. 3 illustrates in detail how the movable part 4 lies on the load cell in each corner of the foundation 1. The movable part is provided with a bowled seat 7 which rests on a cylindrical bearing 8, which is movable in axial direction on the beam shaped second body 9 of the load cell 3. Of course, it is possible to exclude the bearing if the demand of the accuracy is not extremely high. The abutting surface 10 of the seat is formed with a suitable curve form, for example with such a form where the curve may be seen as an integral part of a circle, ellipse, parabola etc. The first beam shaped body 11 of the load cell is attached in a cavity or hole in the attachment 2.

Figure 4A:
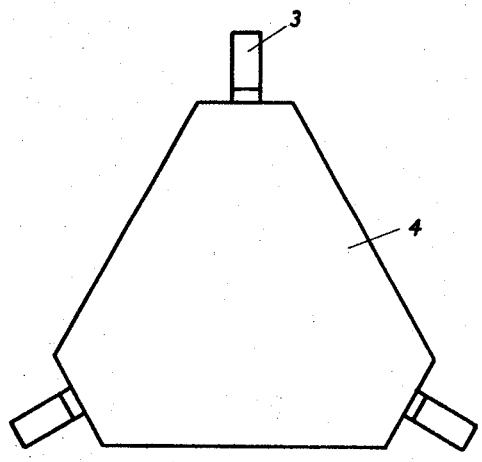
FIGS. 4a – 4b are horizontal views which show different principal placings of the suspension points of the weighing devices.
Figure 4B:
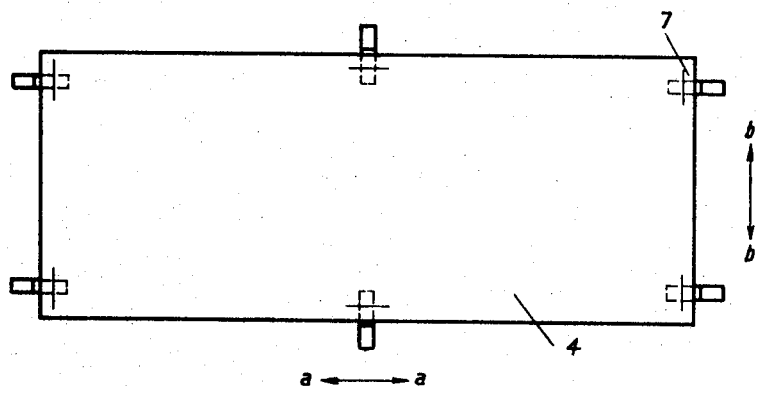

From FIGS. 1 – 3 it is realized that the platform with the shown and described shape is movable in two main directions a—a and b—b, which are orthogonal and extend toward the respective pair of load cells. By this fact it is realized that the platform also movable in all directions in the horizontal plane. A movement transferred to the movable part 4 in any of the actual main directions causes, due to the curve shaped surfaces 10 on actual pair of load cells where the cells are opposite placed to each other that, the platform to receive a higher potential energy which absorbs the whole or part of the kinetic energy of the platform. The rest of the energy may be taken up for example by the foundation so that the load cells are not exposed to excessive forces. In this way the platform can absorb movements caused by temperature, recoils, reactions etc. In order to obtain a wholly self-restoring stable system the number of resting points is not limited to only four and there is no need to provide all the points with abutting means 10 which during the application of the side forces cause the increased potential energy either. FIG. 4a and 4b give examples of other multipoint schemes. In order to prevent the turning of the movable part in its horizontal plane there must be a minimum of potential energy increasing bearing means like those in FIG. 3. A scale with for example three resting points is shown in FIG. 4a, which scale accordingly to this reasoning can be provided with still more load cells against which the platform can abut with bearing means which do not increase the potential energy in the movable part. FIG. 4b shows another embodiment. The cross-section in the horizontal plane is rectangular and the load cells are applied with their neutral axis at a right angle to the sides of the rectangle, whereby two cells are placed at each of the short sides and one cell is placed at each of the long sides. In this construction it is suitable to provide two short side load cells, opposite places, and both the long side cells with potential energy increasing bearing means.

The weighing device according to the invention may also be, for example, a container scale, where the movable part is a container. As with the platform scale, the container scale may be provided with load cells and potential energy increasing abutting bearing means in some or all its resting points.

Depending on frictional conditions and are the restoring of the platform or container, the above mentioned bearing 8 may consists of cylindrical bearings, plain bearings, "needle" bearings, ball bearings, roller bearings etc., and in certain cases the bearing may not be needed.

Figure 5:
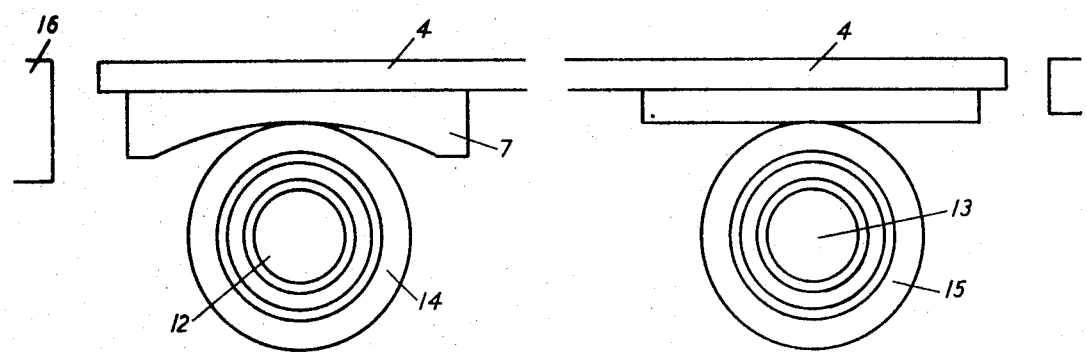

Different abutting bearing means are shown below, which for side forces occuring on the platform or container, partly cause an increased energy level in the movable part, and partly cause a gentle retardation and a gentle backward motion of the movable part when dynamic side forces occur instantaneously on this part. In FIG. 5 the suspension of the movable part is represented by a co-operating pair of load cells, which in accordance with the above mentioned fact can be complemented with other (not shown) load cells. Associated with one of the load cells is an abutting bear means like the bowled seat 7 shown above. Such a bowled seat causes a potential energy increase and soft retardation of the movable part when this part moves in one of its main directions, i.e., the one which coincides with the figure plane. The other load cell cooperates with a flat surface on the movable part and does not cause any potential energy increase. Both of the load cells are provided with cylindrical bearings 14 and 15, which may be movable arranged on their respective load cells in its axial direction at right angle to the figure plane, whereby the sliding of the movable part is facilitated in this direction. The load cells 12 and 13 are assumed to be attached in the foundation and, moreover, a stop which limits lateral movement is illustrated with element 16.

Figure 6:
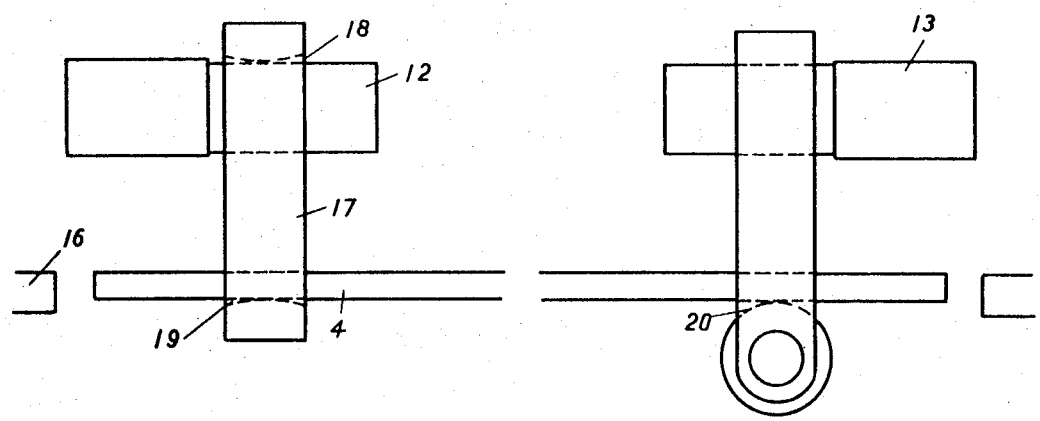

FIG. 6 shows an example of the case where the movable part, in principle, can be arranged below the load cells, and, moreover, the load cell pair in this embodiment is rotated 90° compared with the load cell in FIG. 5. The abutting bearing means are the uniting elements 17 where the movable part 4 and resp. load cell 12 lies close to curved surfaces 18 and 19. The load cell 13 does not in a pronounced way take up side forces because bearing 20 is a cradled roll.

FIG. 7a and 7b show the principle for effective potential energy increasing obtained at a resting point in two main directions perpendicular to each other. In particular, FIG. 7a illustrates the case where the neutral axis of the load cell coincides with the figure plane and FIG. 7b illustrates where the same load cell is turned 90° so that the neutral axis runs in right angle to the figure plane. The movable part then is provided with two bearing brackets 21, in which a shaft 22 is cradled. In turn an eccentric bearing 23 is cradled on the shaft. Also the load cell is provided with an eccentric bearing 24.

FIGS. 8a and 8b illustrate the principle for a potential energy increasing system comparable with the one in FIGS. 7a and 7b and which obtains also an effective soft retardation of the movable part in two main directions. The view according to FIG. 8b is turned 90° compared with the view in FIG. 8a. The movable part is provided with a rotational symmetrical body 25 which has a concave abutting bearing surface 25a. The load cell in this case has an eccentrical bearing 26 which is provided with a concave abutting bearing surface 26a.

From the above described abutting bearing means it should be realized that it is possible to combine the embodiment in FIGS. 7a and 7b with the embodiment in FIG. 8a and 8b in order to obtain an abutting bearing means which in an extremely effective way produces a soft retardation and a backward motion in the movable part when instantaneous dynamic side forces occur in the movable part.

Figure 9A:
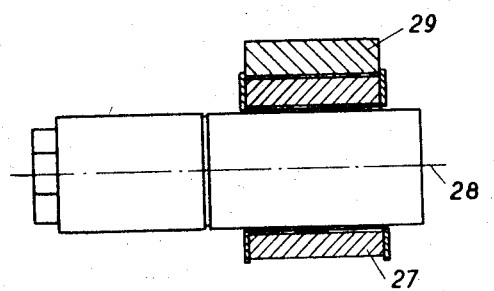
FIG. 9a–10c are vertical cross-sectional views of details which can be applied on the device in FIG. 1.
Figure 9B:
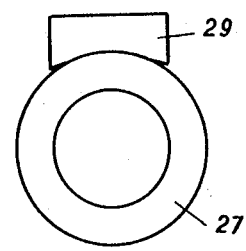
Figure 10A:
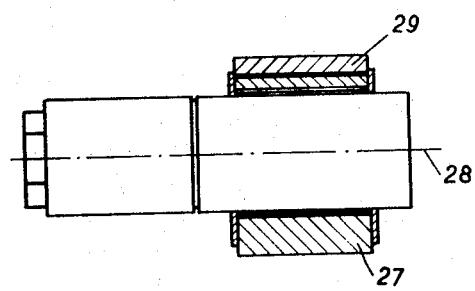
Figure 10B:
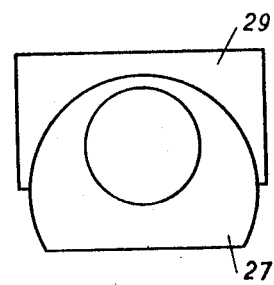
Figure 11:
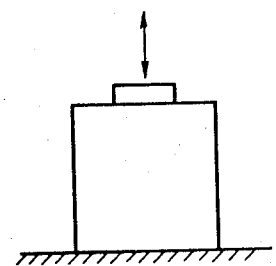
FIG. 11 is a vertical view of a known load cell which has been used in previously known weighing devices.
Figure 10C:
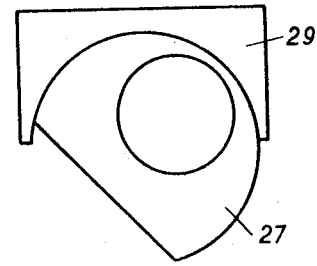

FIGS. 9a and 9b show a detailed example of a bearing 27 applied on a load cell, which bearing is partly is rotatably applied around the neutral axis 28 of the load cell, and partly movable in the axial direction of the cell. The movable part rests on the bearing via a bowled seat 29 like the seat in FIG. 3. The view of FIG. 9b is turned 90° compared with the view in FIG. 9a. For certain dimension situations there is a desired to get a more expedient distribution of pressure on the bearing 27. FIGS. 10a – 10c exemplify how such more even distribution can be performed, whereby the views in FIG. 10b and 10c are turned 90° compared with the view in FIG. 10a. In this case the bearing 27 is eccentric and truncated, which, however, does not concern the distribution itself. As the Figures illustrate the seat 29 lies close to the bearing 27 with a larger surface.

It will, of course, be understood that various changes in details of construction and arrangement of parts may be made by those skilled in the art without departing from the scope of the invention as set forth in the appended claims. For example, there is no need to make the abutting bearing means only of metal, but they may be made of elastic material and comprise rubber elements, helical and/or coil springs, disc springs etc. They may also comprise elastic and non-elastic elements in combination.

We claim:

1. A weighing device comprising a load carrying means, a frame, at least three support means on said frame for supporting said load carrying means, each of said support means comprising a beam-like load cell member having one end fixed to said frame and a freely bendable other end whereby a bending of said beam-like load cell member gives an indication of a load, and at least three abutment means on said load carrying means which are being positioned to rest on the beam-like load cell members, the surfaces of said abutment means being so constructed with respect to said support means that any forces which tend to create horizontal displacements of said load carrying means also cause an upward displacement of said load carrying means.

2. The weighing device of claim 1 wherein said abutment means and said load cell members have cooperating surfaces so contoured with respect to each other that any mutual movement is along the axial direction of the load cell members.

3. The weighing device of claim 2 wherein said abutment means are so constructed to provide a bowl-shaped seat and the cross-section of said load cell is cylindrical.

4. The weighing device of claim 2 wherein said abutment means include a rotationally symmetrical body cradled from said load carrying means.

5. The weighing device of claim 2 wherein said abutment means are elastic.

6. The weighing device of claim 1 wherein said load carrying means are situated below said load cell members.

7. The weighing device of claim 1 wherein said frame and said load carrying means are rectangular with said load cell members being positioned at corners of the frame, the neutral axes of said load cell members being essentially co-linear with the diagonals of the rectangle defined by said frame.

* * * * *